(12) United States Patent
Bond et al.

(10) Patent No.: US 11,103,888 B2
(45) Date of Patent: Aug. 31, 2021

(54) APPARATUS AND METHOD FOR COATING PIPES

(71) Applicant: SERIMAX HOLDINGS, Roissy-en-France (FR)

(72) Inventors: Phil Bond, Lancashire (GB); Carl Vincent, Flintshire (GB); Terence Cottrell, Burnley (GB)

(73) Assignee: SERIMAX HOLDINGS, Roissy-en-France (FR)

( * ) Notice: Subject to any disclaimer, the term of this patent is extended or adjusted under 35 U.S.C. 154(b) by 329 days.

(21) Appl. No.: 15/045,310

(22) Filed: Feb. 17, 2016

(65) Prior Publication Data
US 2016/0236233 A1 Aug. 18, 2016

(30) Foreign Application Priority Data

Feb. 17, 2015 (EP) .................................... 15155405

(51) Int. Cl.
| | | |
|---|---|---|
| *B05B 13/04* | (2006.01) | |
| *B05D 1/02* | (2006.01) | |
| *F16L 58/18* | (2006.01) | |
| *B05B 13/02* | (2006.01) | |
| *B05B 15/62* | (2018.01) | |

(52) U.S. Cl.
CPC ...... *B05B 13/0436* (2013.01); *B05B 13/0207* (2013.01); *B05D 1/02* (2013.01); *F16L 58/181* (2013.01); *B05B 15/62* (2018.02)

(58) Field of Classification Search
CPC ............ B05B 13/0207; B05B 13/0214; B05B 13/0436
See application file for complete search history.

(56) References Cited

U.S. PATENT DOCUMENTS

| | | | |
|---|---|---|---|
| 4,205,694 A | * | 6/1980 | Thompson .......... B05B 13/0214 118/307 |
| 5,238,331 A | | 8/1993 | Chapman |
| 6,881,266 B1 | * | 4/2005 | Daykin ............... B05B 13/0436 118/302 |
| 2010/0133324 A1 | | 6/2010 | Leidén et al. |
| 2013/0214034 A1 | * | 8/2013 | Leiden ................ B29C 47/0866 228/176 |

FOREIGN PATENT DOCUMENTS

| | | |
|---|---|---|
| GB | 2 285 592 | 7/1995 |
| GB | 2 370 800 | 2/2004 |

OTHER PUBLICATIONS

Search Report dated Aug. 18, 2015 in European patent Application No. EP 15 15 5405.

* cited by examiner

*Primary Examiner* — Dah-Wei D. Yuan
*Assistant Examiner* — Stephen A Kitt
(74) *Attorney, Agent, or Firm* — Oblon, McClelland, Maier & Neustadt, L.L.P.

(57) ABSTRACT

An apparatus for coating pipes includes a spraying device rotatable around a pipe. The coating apparatus includes a guiding ring mounted around the pipe and a carriage to be mounted on the guiding ring, the carriage being motor driven, the motor being enclosed into the carriage and the carriage including an adjustable device to be detachably mounted on the guiding ring.

11 Claims, 4 Drawing Sheets

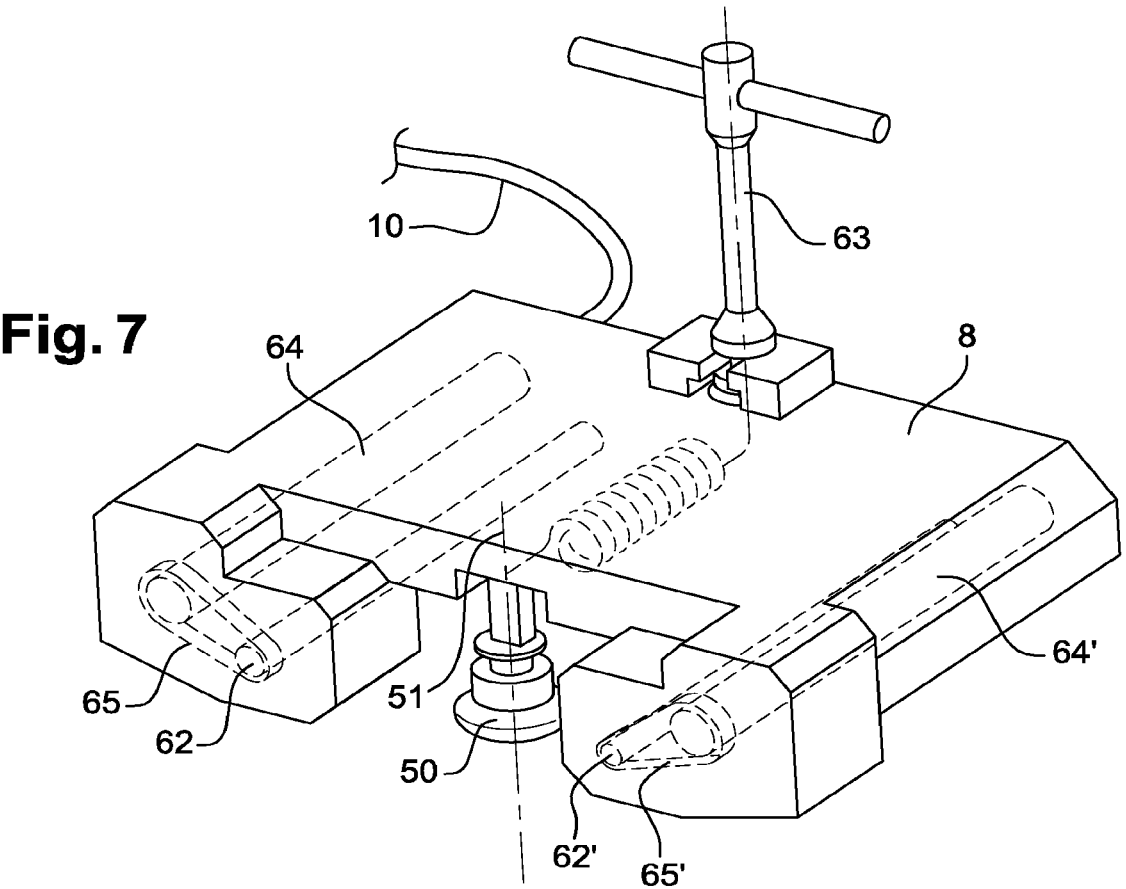
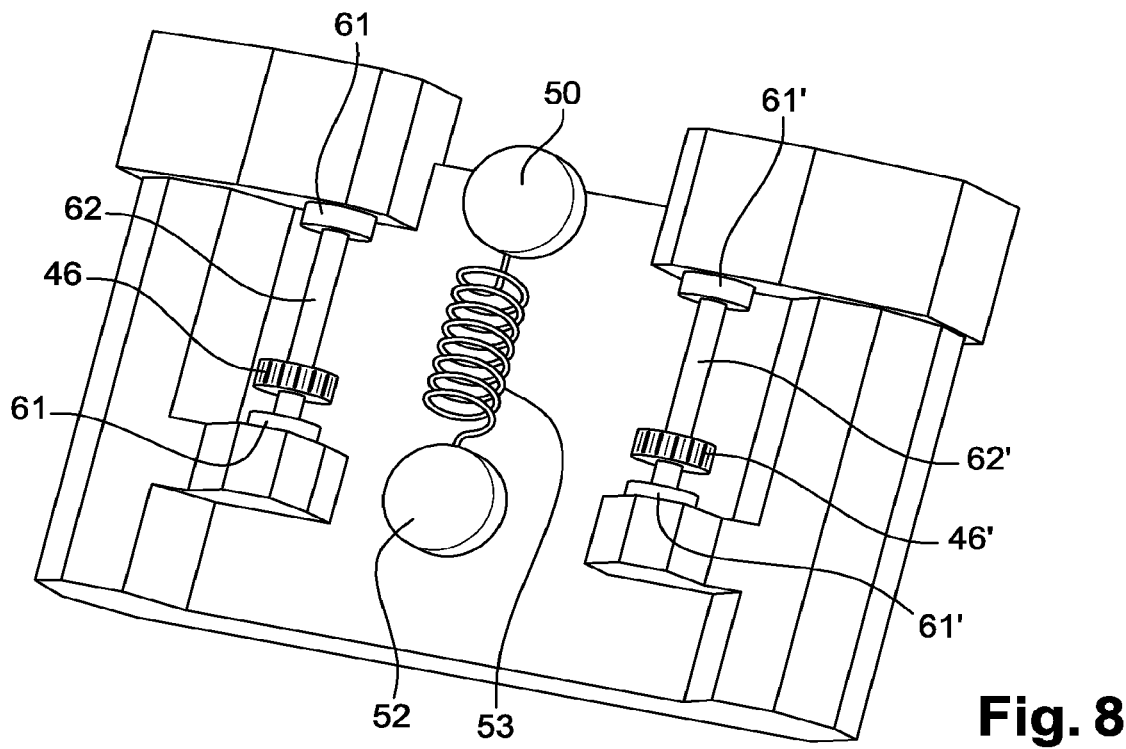

APPARATUS AND METHOD FOR COATING PIPES

The present invention relates to an apparatus and method for coating pipes and particularly, but not exclusively, to apparatus and methods for coating girth welds on oil and gas pipelines on site where the pipeline is being laid. Oil and gas pipelines are usually formed from many lengths of externally coated steel pipe which are welded together before they are laid. Pipes being already welded; there is a need to coat newly formed weld and adjacent area without any need for the pipe itself to be rotated.

Prior art devices for coating are awkwardly shaped and needs heavy device mounted around pipe at the location of the weld. For example, we know from GB-2285592 a low pressure spray coating apparatus for fusion bonded epoxy coating. Such apparatus basically comprises two halves support frame holding a two halves rotary frame; the rotary frame being mounted rotatable within the support frame. The support frame is providing an annular reservoir chamber for the powder to be delivered by delivery port of the rotary frame inwardly oriented in the direction of the pipe.

Granted patent GB2370800 is describing another type of apparatus for coating pipes dedicated to the distribution of mixture of at least two liquids with high pressure delivery jets. This apparatus also comprises a support frame and a rotary frame retained into the support frame.

Difficult to mount around a pipe, this type of apparatuses needs a dedicated lifting system to bring and mount support frame and rotary frame at each desired coating location.

There is a need for a solution that could overcome prior art drawbacks. For example there is a need for a solution that could increase the number of weld that could be coated in a day. There is also a need to lower the global of cost of on-site coating operations; for example in terms of number of people and equipment, like lifting system required to operate on site. There is also a need for a process that could avoid flushing of solvent through the spray nozzle before each coating; and so far could limit the quantity of solvent needed to globally coat the welds of a whole pipeline.

To this end, the invention provides a coating apparatus comprising a carriage dedicated to be mounted on a guiding ring, the guiding ring being mounted on a tubular to be coated, drive means for driving the carriage along the guiding ring, at least one delivery head mounted on the carriage for applying a coating to an article, a supply reservoir of coating material and a communication hose communicating between a supply port of the reservoir and the delivery head such that, as the carriage is rotated by the drive means, a supply of coating material is provided to the delivery head to enable a coating to be applied to the tubular, wherein the drive means comprises a motor, the motor being enclosed into the carriage; the carriage comprising adjustable means to be detachably mounted on the guiding ring.

Preferably, the delivery head extends from an outer periphery of the guiding ring; the delivery head being arranged in order to deliver coating material towards the center of the apparatus. Thus, the delivery head is easily accessible from the outer periphery of the pipe. And moreover, the carriage may be of low weight in order to reduce the number of person needed to remove it from the guiding ring.

More preferably, the apparatus comprises a direction control unit of the carriage along the guiding ring. Guiding ring being peripheral to the tubular, the carriage may then be moved clockwise or counterclockwise around the tubular. The coating apparatus travels either direction around the pipe, and direction may be reversed to perform several travels, and so far several layer of material quickly deposited.

Furthermore, a coating apparatus in accordance with the invention may comprise one or more of the following characteristics:
- a mixing chamber and two reservoirs, each reservoir feeding the mixing chamber with a determined ratio of the content of each reservoir, the mixing chamber being connected through a whip end hose to the delivery head;
- a delivery control unit in order to control delivered coating material and allow stopping the supply of material to the delivery head when at least one parameter is outside predetermined acceptable ranges;
- a pumping unit to feed the delivery head with coating material under pressure, preferably coating material may be pulverized at high pressure, for example over 2000 psi;
- an air driven motor, or any suitable alternative drive means.

To this end, a single compressor may be connected to both motor and pumping unit to respectively manage speed and direction for the motor, and quantity of liquids pumped by the pumping unit. If air is used, but electric systems are available.

In order to help the running of the carriage along the guiding ring, the carriage comprises a roller, the roller may act directly against the tubular or against the guiding ring itself.

To ease removal of the carriage from the guiding unit, the carriage comprises a locker to adjust roller location. The locker may authorize the roller to be retained under an annular side edge profile. Alternatively to ease the removal of the carriage, similar retaining systems such as v-rollers with v-edge profile may be used.

A further object of the present invention is an assembly for coating a tubular comprising a coating apparatus according to the invention and a guiding ring, wherein the guiding ring is mounted around the outer periphery of the tubular in order for the carriage to coat a 360° section of the outer surface of the tubular.

For example, according to a first embodiment of such an assembly, the guiding ring is formed in two rigid halves, the two halves being pivotally connected to enable the apparatus to be opened to receive or release an article; the two halves being held closed by means of a catch. The guiding ring may be formed of more than two halves.

As an alternative, according to a second embodiment of the assembly comprises a guiding ring being a flexible adjustable belt.

In addition to the above, the invention aims also to provide a new process for coating that allows to coat an higher number of welds per day, and also avoid flushing of solvent prior to each coating operation.

To this end, the invention defines a process for coating a pipe with an assembly according to the invention wherein it comprises the following steps:
- Place at least one first guiding ring around the pipe at a first location.
- Fix a motorized carriage to a first guiding ring
- Spray the coating at the first location
- Remove the motorized carriage from the first guiding ring
- Control the time elapsed since the delivery of material stopped; and authorize a small amount of coating to be sprayed on a suitable area or receptacle until the next coating operation occurs.

To facilitate efficiency of operation, at least a second guiding ring may already be placed around a pipe at a second location, where the motorized carriage may be fixed on the second guiding ring and start coating at the second location.

According to this new process, the coating apparatus is rotated around the periphery of the pipe over more than 360°; preferably about 370° around the pipe, and then rotated back to the initial position, the coating delivery being stopped when the coating apparatus is changing direction relative to the guiding ring. Preferably the coating operation is moving the carriage around the pipe over less than 400° in order to facilitate the management of the supply hoses lengths around the pipe.

For example, the coating material delivered is a mixture of at least two liquid components. Especially, the delivery head spray a multi component liquid as the ones proposed by Specialty Polymer Coating Inc. For example, at least one component is a base to be mixed with an additional component, a catalyst like an hardener. Coating deposited on welds of pipes is seeking an anticorrosion protection, and or mechanical protection, when applied as an overcoat. Coating material may either be an epoxy or urethane based coating.

The present invention will be better understood from the following detailed description of some embodiments made by way of non-limiting example and illustrated in the accompanying drawings, in which:

FIG. 7 shows a below view of a carriage of the invention before it is connected to a guiding ring;

FIG. 8 shows an above view of a carriage of the invention before it is connected to a guiding ring;

Figure 1:
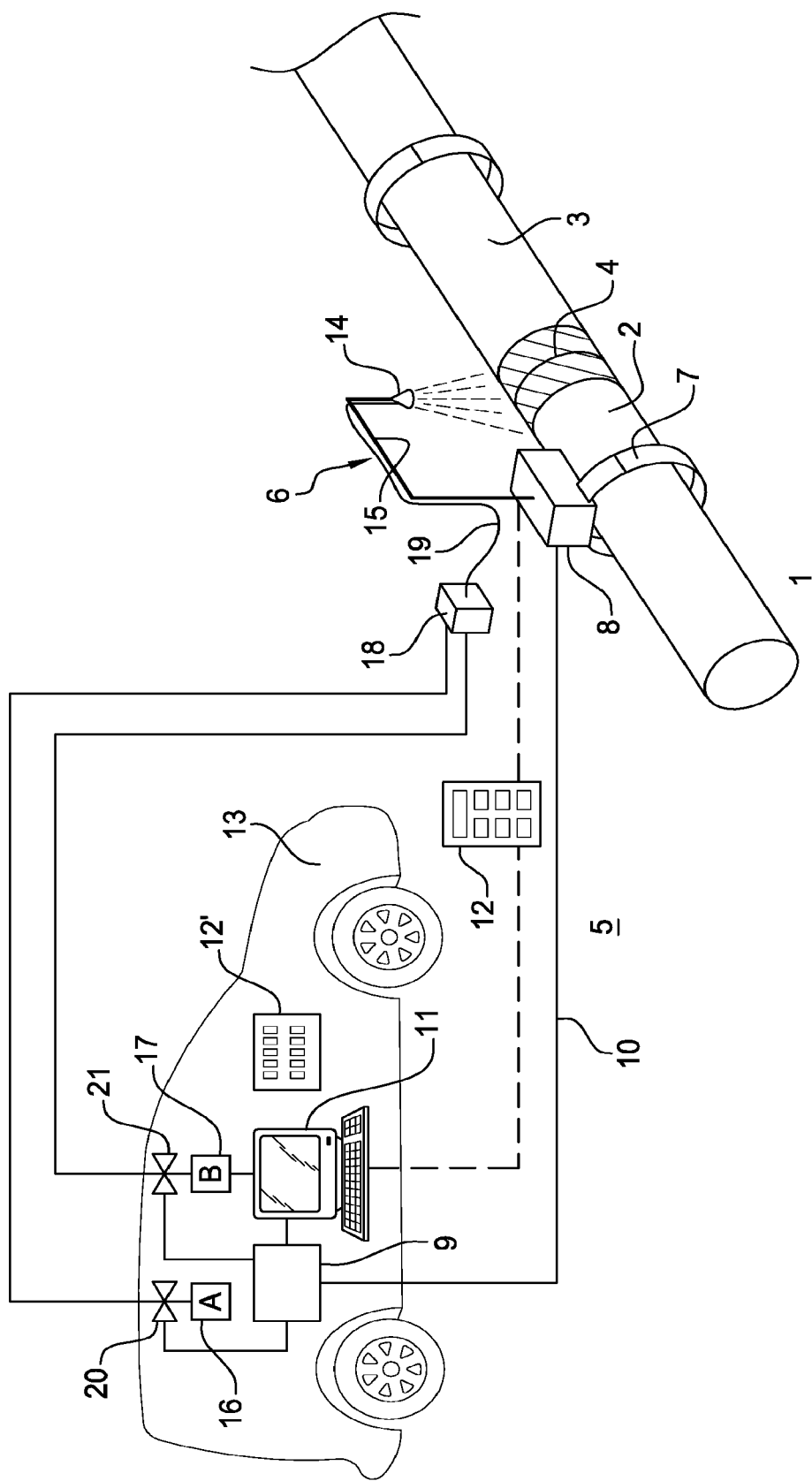
FIG. 1 illustrates an assembly for coating a pipe according to the invention.

FIG. 1 represents a part of a tube 1 comprising at least two tubular sections 2 and 3 welded end by end. A weld zone 4 is defined between sections 2 and 3. The assembly 5 according to the invention aims to provide means to coat the weld zone all around from its outer periphery.

The assembly 5 comprises a coating apparatus 6 movable along a guiding ring 7 encircling the tube 1 away from the weld zone 4. The guiding ring 7 is fixed around the pipe. The coating apparatus 6 comprises a motorized carriage 8. In this example, the motorized carriage 8 is air driven by an air compressor unit 9. A two way input and output hose 10 is provided between the air compressor unit 9 and the motorized carriage 8.

The assembly 5 comprises a direction control unit 11 that select which one of the two way hose 10 is supplied with pressurized air by the air compressor unit 9 in order to determine whether the motorized carriage 8 will move clockwise or counter clockwise along the guiding ring 7.

The direction control unit 11 also works as a stop and start control unit that allow to tart or stop the displacement of the carriage along the ring.

An operator may use a remote control unit 12, either wired or wireless, to command the direction control unit 11.

In order to lower the weight of the carriage 8, both the air compressor 9 and the direction control unit 11 are held separately. For example, they are held together on a truck 13. The truck may comprise an additional control unit 12' to command the control unit 11.

The coating apparatus 6 comprises a delivery head 14. The delivery head 14 is handled by arms 15 linked to the motorized carriage 8. Thus the delivery head 14 is provided away from the carriage 8 and the ring 7. The delivery head 14 is oriented in order to allow the coating of the weld zone 4. Preferably, the delivery head 14 is oriented toward the center of the pipe. The product that is delivered by the delivery head will be pulverized radially inwardly onto the pipe outer wall.

According to the example represented FIG. 1, the delivery head 14 is supplied with a mixture of two components respectively A and B. To this end, the assembly comprises two reservoirs respectively 16 and 17. As far as mixture of both component A and B is very reactive, and may cure very rapidly, they are mixed almost at the delivery head 14. Both reservoir 16 and 17 are respectively feeding a mixing chamber 18, which is connected by a whip end 19 to the delivery head 14.

In order to achieve the same goal of lowering the weight of the coating apparatus 6, both reservoirs 16 and 17 and the mixing chamber 18 are held separately. For example, reservoirs are held on the same truck 13. As far as the truck may stand away from the coating apparatus 6, the mixing chamber 18 is held in between the truck 13 and the coating apparatus in order to limit the length of the whip end 19 where the mixed components may cure all together when not distributed.

The mixture ratio of both components is managed through respective valves 20 and 21 under the control of a same computer as the direction control unit 11. The distribution through the delivery head being pressurized in order to spray the mixture as an oriented cloud of particles, both components A and B are supplied to the mixing chamber under pressure. This pressure is provided by the air compressor unit 9 which comprises additional outputs feeding both valves 20 and 21, in addition to the output for the motorized carriage 8.

The control unit 11 controls the flow rate of each component and associated ratio. In addition to that, the temperature of reservoirs 16 and 17 may also be computer controlled by the control unit 11.

Figure 2:
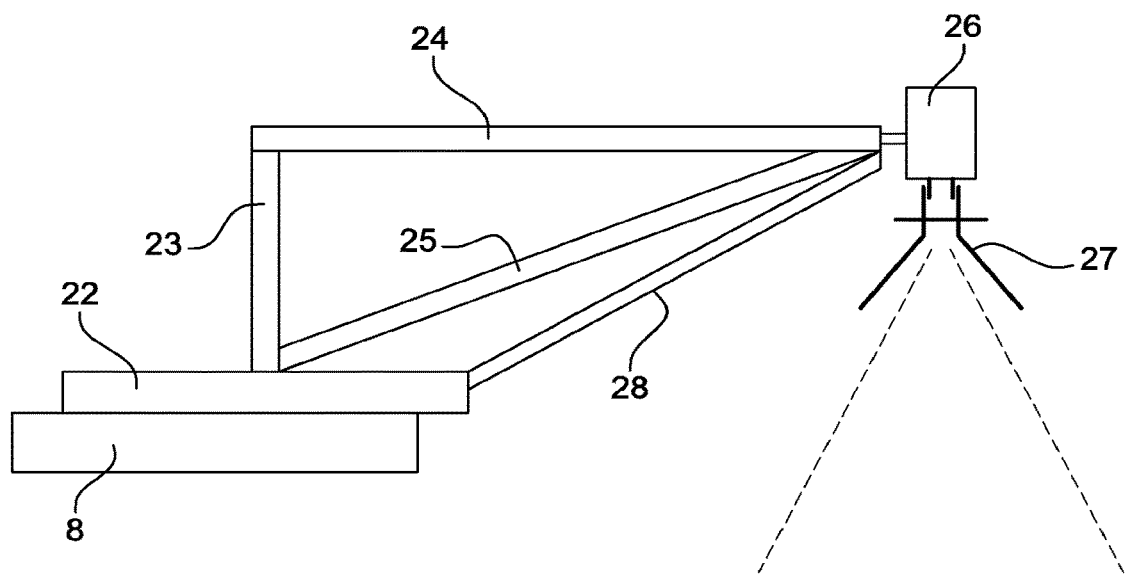
FIG. 2 shows a sectional view of a sub unit of the carriage according to the invention.
Figure 3A:
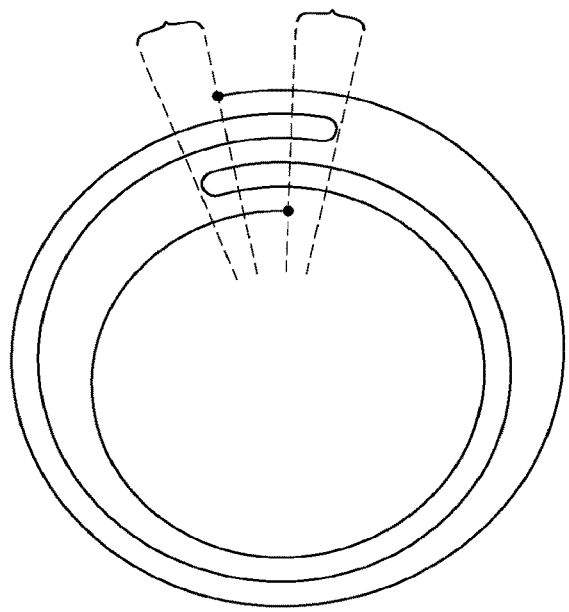
FIGS. 3a and 3b show schematic patterns of the layers of coating material that may be deposited with a coating apparatus according to the invention.
Figure 3B:
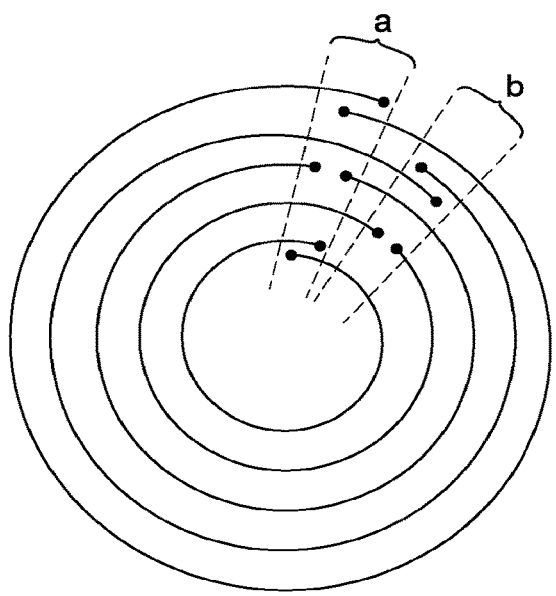
Figure 4:
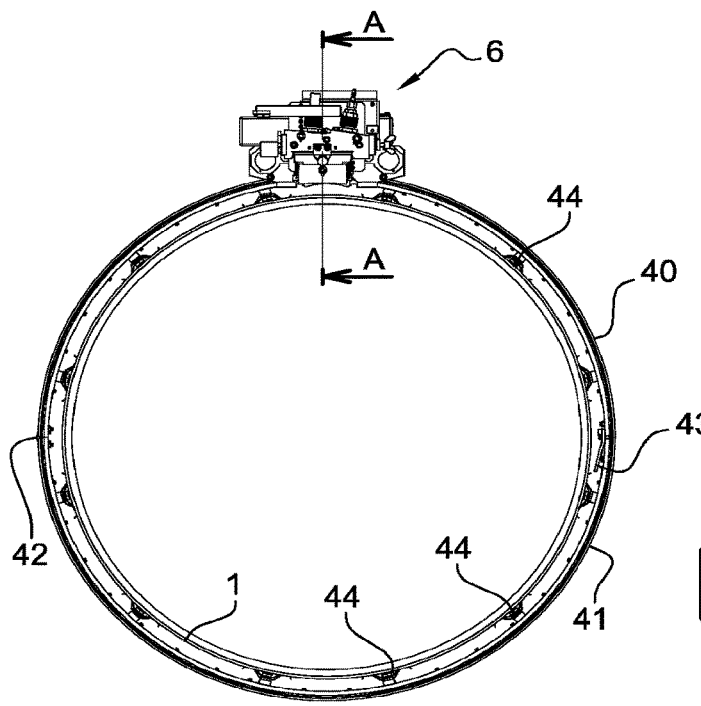
FIG. 4 shows a transversal view of an assembly according to the invention mounted around a pipe.
Figure 5:
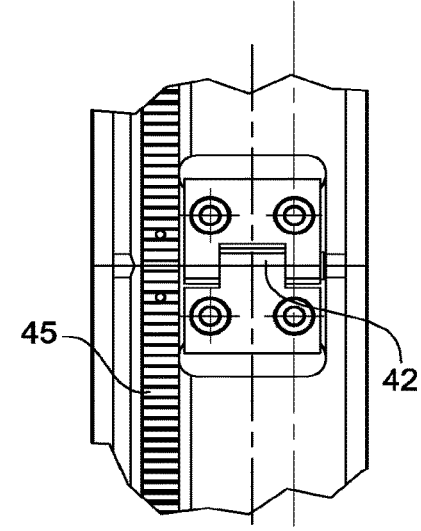
FIG. 5 shows an outer view of an outer surface of a guiding ring of an assembly according to the invention.
Figure 6:
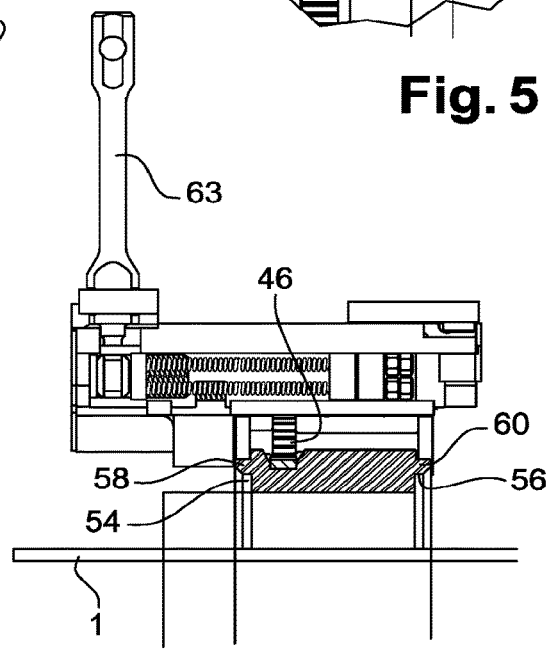
FIG. 6 shows a sectional view of an assembly of the invention in the sectional plane A-A indicated in FIG. 4.

FIG. 2, the arm 15 is held by a mounting plate 22 fixed on the motorized carriage 8. The arm 15 may be adjustable in height and length in order to adjust the position of the delivery head relative to the dimension of the weld zone 4 to be coated. Thus, the arm 15 comprises an adjustable upstand arm 23 rising from the mounting plate in order to stand radially outwardly relative to the pipe. The arm 15 comprises a spray arm 24 orthogonally fixed to the upstand arm 23. Opposite to the upstand arm, the spray arm 24 holds the delivery head 14. In order to allow the spray arm 24 not to bend under the weight of the delivery head, the arm 15 comprises a strengthening arm 25. The whip end 19 may be fixed to both upstand arm 23 and spray arm 25.

The arm 15 may comprise an additional arm to hold the whip end 19 away from the guiding ring 7 and the pipe 1 during motion of the carriage 8 along the ring. In addition thereto, a hose rail may be added to manage the hose length in order to avoid hoses lying on ground. Such feature could allow a better temperature management of component to be sprayed.

Preferably, the arm 15 holds a unique delivery head. The delivery head is mounted on the spray arm with a slight adjustable axial location. Preferably the delivery head comprises an on/off valve 26 and a nozzle tip end 27. The on/off valve 26 is comprising an input port to be connected to the whip end 19. The on/off valve 26 is delivering the mixed product to the nozzle tip end 27. Nozzle tip end 27 is for example a GRACO® XHD Reverse-A-Clean tip, to help clear clogs away. Such nozzle comprises a tip guard and a rotatable tip removably mounted in the tip guard. The rotatable tip is preferably providing a line spray shape. For example, the inner geometry of the tip is such that the opening distribution circular orifice is 9/100 inch and opens in a longitudinal slit of 27° of aperture from the circular orifice.

The spray arm 24 is long enough to prevent the vortex created by the motion of the motorized carriage along the guiding ring not to modify the calibrated spray fan of the delivery head. So far, the length of the arm is selected to be long enough so that the particles of spray fan will not contaminate the guiding ring or the motorized carriage and attachment means of the carriage to the ring.

Even if the spray fan is calculated to remain away from the carriage 8, the coating apparatus 6 may also comprise a shield 28. The shield 28 may be cut in a plastic sheet, and rounded in order to cover at least 60° around the spray fan. The shield 28 may be handled from the free end of the spray arm, and retained on the mounting plate.

As schematically represented FIG. 2 the coating apparatus 6 is much lighter and infinitely more manoeuvrable than prior art device. This apparatus being at least less than 20 kg, preferably less than 15 kg, and more preferably less than 10 kg, there is no more need for a dedicated lifting system. A single man is able to lift such apparatus.

FIGS. 3*a* and 3*b* represent patterns of coating layers deposited during clockwise and counter clockwise runs of the carriage along the guiding ring.

The coating operation is computerized controlled for example by the control unit 9. Control unit 9 may record tracking of spraying data (time, mixture, ratio sprayed, pumping flow rate, temperature of the material in their respective reservoir, temperature of supply hose bringing each component of the mixture up to the mixing chamber, number of rotations of the carriage, speed of the carriage, device information (carriage serial number, guiding ring reference, nozzle tip end dimension . . . ) in addition to data relating to environment conditions of operation (temperature, humidity wind speed and orientation . . . ).

The control unit 9 may comprise an alarming feature in case a selection of continuously controlled data (ratio control is automatic shut down) are not within acceptable ranges. Thus qualification condition of operation will be controlled on site, coating per coating, and this will allow ensuring the best quality of coatings applied.

Speed of the carriage together with the nozzle tip end definition may allow a control of the height of material deposit. An acceptable deposit layer shall be set between 100 and 500 micrometers; preferably between 200 to 400 micrometers. Relative thin layers are required in order to avoid material to sag due to gravity before curing on the pipe.

For example, the first pattern shown of FIG. 3*a* shows that the carriage always start spraying the coating material when at the upper most position around the pipe. Then a more than 360° run is completed by the carriage, during which the coating is continuously performed. The carriage 6 runs in the same direction for a few additional degrees. For example, up to 370°. Then the control unit 9 is programmed to stop spraying during the change of direction of the carriage. Due to inertia, there is still a slight move in the same direction before the strict change of direction and the start of the new direction of the carriage during which the delivery head may stop coating. This feature will allow restraining the size of the overlapping layers, and thus diminishing the risk of sagging. This feature is advantageous when the coating material needs to be deposited in several layers.

As an alternate pattern, as shown on FIG. 3*b*, the control unit 9 may be programmed to start and stop spraying at a defined change in angle, that is to shift the start and stop positions to further reduce the size of over lapping layers. Pattern of FIG. 3*b* shows a first layer on the pipe with overlapping portion in region "a". This first layer is covered by a second layer, which is slightly less than a 360° layer. Ends of the second layer are in a region "b". Then a third layer is applied, this third layer may also have non overlapping ends, but ends are here in the region "a". Then a fourth layer is applied. This fourth layer is represented with overlapping end portions in region "b". Then a final fifth layer, with overlapping end portions in region "a" is formed. According to the invention, the coating patter may propose successive layers starting alternatively in two distinct regions of the upper most surface of the pipe, some layers being overlapping, some other layers not. Preferably the final outermost layer may propose overlapping end portions.

FIG. 4 shows a lateral view of a section of a pipe where a guiding ring 7 and a coating apparatus 6 are mounted. A removable arrangement between apparatus 6 and guiding ring is held. The guiding ring is preferably mounted in order to be perpendicular to the pipe axis.

The guiding ring 7 comprises two halves 40 and 41 pivotally mounted around a pivot axis 42 parallel to the length of the pipe 1. At the opposite side of the pivot, the two halves comprise a knot 43 to allow the guiding ring to stay in a closed position around the pipe. The guiding ring is provided with regularly disposed springs 44 urged against the pipe outer wall. Springs 44 allow centering the pipe 1 within the guiding ring 7. FIG. 5, opposite to the pipe outer wall, the guiding ring 7 is provided with a track of teeth 45 dedicated to engage with teeth of a sprocket 46 held in the motorized carriage 8 as shown FIG. 6.

The weight of the guiding ring itself is also maneuverable by hands with the cooperation of two people. Again there is no specific need for a dedicated lifting system.

FIG. 7, the motorized carriage 8 comprises at least one roller 50 engaging the guiding ring 7. The roller 50 is freely rotatable around a fixed axle 51 of the carriage. The carriage is mounted on the guiding ring and easily detachable from the guiding ring.

For example, as represented FIGS. 7 and 8; the carriage 8 comprises two rollers 50 and 52 held at a defined distance due to the action of a spring 53. Both rollers 50 and 52 act against respective lateral bearing surfaces 54 and 56 of the guiding ring. Both bearing surfaces 54 and 56 are oriented radial to the outer periphery of the pipe. The guiding ring comprises two opposite lateral annular side edge 58 and 60 covering both bearing surfaces 54 and 56 to limit the radial location of the rollers relative to the guiding ring. On their outer periphery, the lateral annular side edge 58 and 60 present surfaces in contact with end sections 61 of the carriage 8. End sections 61 are distal oversized location of the axle 62 wearing the sprocket wheel 46.

Alternatively the rollers 50 and 52 may be linked by a spring under tension, the spring may be extended upon action of a command stick 63, in order to space them away in order to disrupt contact with opposite bearing surfaces of the guiding ring. In both case, with either spring under compression or tension, the command stick 63 is maneuverable by hands, for example by at least ¼ turn, the command stick may release the carriage from the guiding ring. For safety reason, the carriage is removed from the guiding ring when at the top of the pipe.

An electronic control of the roller location may be ensured by the control unit 11 in order to control the correct position of the carriage on the guiding ring. Electronic control might be a control of the distance between roller or the torque value exerted on the command stick 63.

Preferably, as shown FIGS. 7 and 8, the carriage 8 comprises two toothed axle 62 and 62' both engaged with the rack 45 of the guiding ring. Both toothed axle are individually motorized. To this end the carriage comprises two motors 64 and 64'; each transmitting rotational movement to their respective toothed axle 62, 62' through a belt 65, 65'. Both air motors are supplied in series with compressed air from the air compressor 9.

Such pneumatic motors allow reaching a speed of the carriage along the guiding ring of about 20 to 40 meters/minute. Alternatively, motors might be electric motors.

Figure 9:
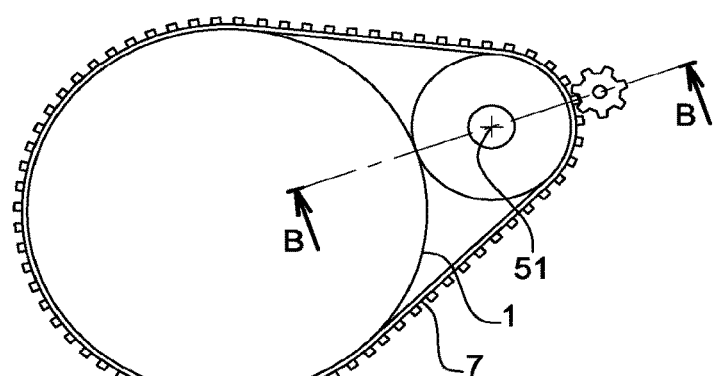
FIG. 9 shows a cross-sectional view of a second alternative embodiment of an assembly according to the invention.
Figure 10:
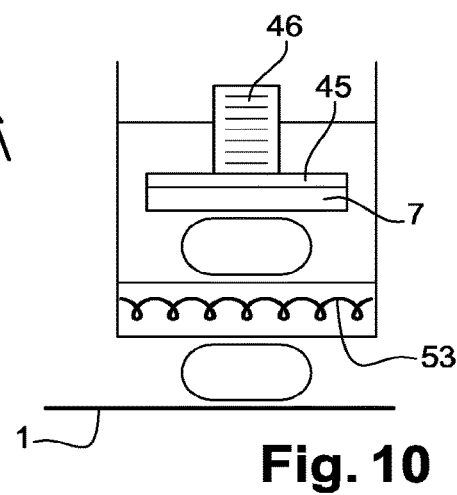
FIG. 10 shows a sectional view of the assembly in the sectional plane B-B indicated in FIG. 9.

Alternatively, as shown FIGS. 9 and 10, the guiding ring 7 is an adjustable belt. The adjustable ring is a belt mounted loose around the pipe in order to allow a roller of the carriage to be in direct contact with the outer periphery of the pipe; below or around the belt location relative to the pipe. In that case, in order to be removably mounted, the axle of the roller may be disconnected from the carriage by at least one end in order to allow the carriage to be removable from the belt.

Also the carriage is moving fast along the guiding ring, an advantageous aspect of the invention lies also in the process developed accordingly which limit solvent flushing in environment.

In order to coat a pipe at two axially distinct locations without solvent flushing between both locations, the process comprises the following steps:
Place at least two guiding ring around the pipe at their respective distinct location
Fix a motorized carriage to a first guiding ring
Spray the coating at the first location
Remove the motorized carriage from the first guiding ring
Control the time elapsed since the spray stopped; and authorize a small amount of coating to be sprayed on a suitable area until the next coating operation occurs
Fix the motorized carriage on the second guiding ring and start spraying the coating at the second location.

For example, a suitable area may be directly on the outer surface of the pipe, away from the weld area to be coated, or within a canister that would have been fixed around the delivery head after the spray at the first location, prior or after removal of the carriage from the guiding ring.

Time elapsed control may be manually controlled or computerized control for example by the control unit 11. In that case, distribution of coating material between two locations may be automatically commanded by the computerized control. In addition, an alarm may ring to inform operators that distribution of coating will occur, or to require them the action of manually acting on the distribution command of their remote control unit 12 or on truck unit 12'.

Thus, flushing of solvent would only be required at the beginning and or the end of the day. Guiding rings being easily maneuverable, operators may place the guiding ring from the first location to a third location during the coating at the second location. With very few equipment, meaning at least one assembly and an additional guiding ring, operators may coat lots of welds on a same day.

The control unit 11 may allow the operator to select at least one of the following options:
to start or stop a coating program;
to select a coating program;
to force the spraying to continue after the end of a coating program or between two coating programs;

A coating program comprises a speed definition of the rotation of the carriage around the guiding frame, component chemistry, corresponding mixture ratio when at least two distinct components are used together, number of runs of 360° around the pipe, size of the nozzle and distance of the nozzle relative to the pipe.

The invention claimed is:

1. A coating apparatus comprising:
a carriage configured to be mounted on a guiding ring, the guiding ring being mounted on a tubular article to be coated,
drive means for driving the carriage along the guiding ring,
at least one delivery head having a nozzle tip, the delivery head being mounted on the carriage for applying a coating to an article, wherein the delivery head is spaced from any part of the carriage in a direction of the length of the tubular article when the carriage is mounted on the guiding ring by a distance sufficient that any air disturbance created by the motion of the carriage along the guiding ring will not modify the calibrated spray fan sprayed from the nozzle tip,
a supply reservoir of coating material and a communication hose communicating between a supply port of the reservoir and the delivery head such that, as the carriage is rotated by the drive means, a supply of coating material is provided to the delivery head and is sprayed from the nozzle tip as a calibrated spray fan, to enable a coating to be applied to the tubular article,
wherein the drive means comprises a motor, the motor being enclosed into the carriage;
the carriage comprising:
adjustable means to be detachably mounted on the guiding ring,
a roller, to help the running of the carriage along the guiding ring, the roller acting either directly against the tubular article or against the guiding ring itself, and a locker to adjust a roller location in order to allow removal of the carriage from the guiding ring.

2. A coating apparatus according to claim 1, wherein the delivery head extends from an outer periphery of the guiding ring; the delivery head being arranged in order to deliver coating material towards the center of the apparatus.

3. A coating apparatus according to claim 1, wherein it comprises a direction control unit of the carriage along the guiding ring.

4. A coating apparatus according to claim 1, wherein it comprises a mixing chamber and two reservoirs, each reservoir feeding the mixing chamber with a determined ratio of the content of each reservoir, the mixing chamber being connected through a whip end hose to the delivery head.

5. A coating apparatus according to claim 1, wherein it comprises a delivery control unit in order to control delivered coating material and allow stopping the supply of material to the delivery head when at least one parameter is outside predetermined acceptable ranges.

6. A coating apparatus according to claim 1, wherein it comprises a pumping unit to feed the delivery head with coating material under pressure.

7. An assembly for coating a tubular article comprising a coating apparatus according to claim 1, wherein the guiding ring is mounted around the outer periphery of the tubular article in order for the carriage to coat a 360° section of the outer surface of the tubular article.

8. The assembly according to claim 7, wherein the guiding ring is formed in two rigid halves, the two halves being pivotally connected to enable the apparatus to be opened to receive or release an article; the two halves being held closed by a catch.

9. The assembly according to claim 7, wherein the guiding ring is a flexible adjustable belt.

10. The coating apparatus according to claim 6, wherein the coating material is pulverized at high pressure.

11. The coating apparatus according to claim 10, wherein the high pressure is over 2000 psi.

\* \* \* \* \*

UNITED STATES PATENT AND TRADEMARK OFFICE
CERTIFICATE OF CORRECTION

| | |
|---|---|
| PATENT NO. | : 11,103,888 B2 |
| APPLICATION NO. | : 15/045310 |
| DATED | : August 31, 2021 |
| INVENTOR(S) | : Bond et al. |

It is certified that error appears in the above-identified patent and that said Letters Patent is hereby corrected as shown below:

In the Claims

In Column 8, Claim 2, Line 51, delete "A coating" insert --The coating--,
    Claim 3, Line 55, delete "A coating" insert --The coating--,
    Claim 4, Line 58, delete "A coating" insert --The coating--,
    Claim 5, Line 63, delete "A coating" insert --The coating--,
In Column 9, Claim 6, Line 1, delete "A coating" insert --The coating--.

Signed and Sealed this
Seventeenth Day of May, 2022

Katherine Kelly Vidal
*Director of the United States Patent and Trademark Office*